Figure 1:
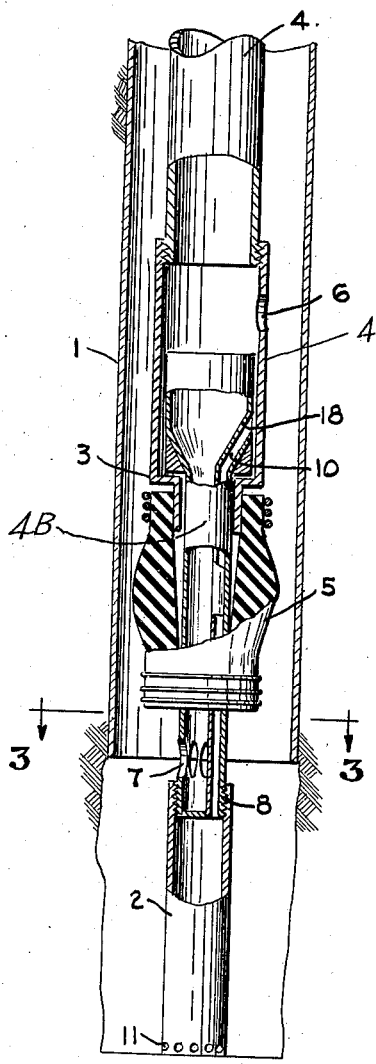

Dec. 19, 1944.  H. H. HOLMES ET AL  2,365,639
OIL WELL FILTER
Filed Dec. 6, 1941  2 Sheets-Sheet 1

H. H. Holmes
W. E. Lawson
INVENTORS

BY Thos. A. Wilson

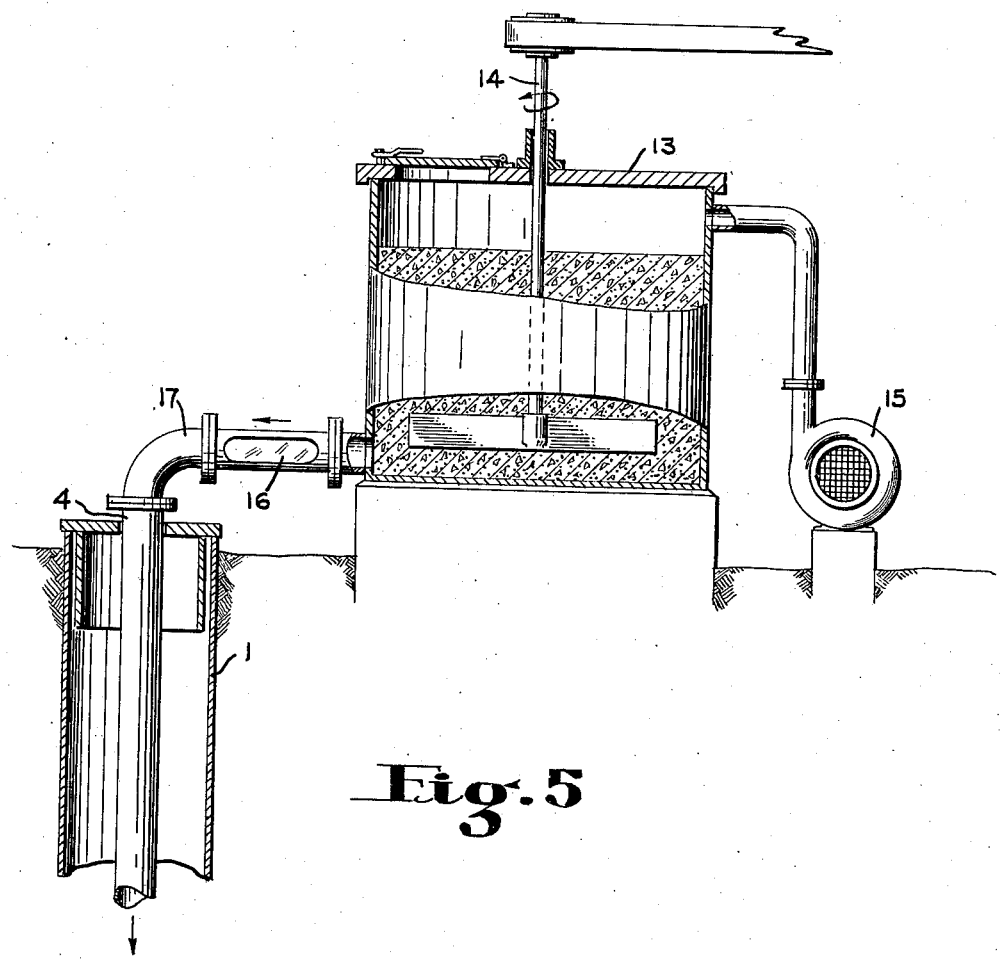

Patented Dec. 19, 1944

2,365,639

UNITED STATES PATENT OFFICE 2,365,639

OIL WELL FILTER

Harrison Howard Holmes, Woodbury, N. J., and Walter Eastby Lawson, Wilmington, Del., assignors to E. I. du Pont de Nemours & Company, Wilmington, Del., a corporation of Delaware Application December 6, 1941, Serial No. 421,923

1 Claim. (Cl. 166—10)

The present invention relates to the art of petroleum production, and in particular to a process for forming oil well filters of porous cement.

Contrary to expectation, the problem of forming such a filter in situ from porous cement differs markedly from that of preparing gravel pack filters or the like. This difference is due to certain peculiar properties of the porous cement grout prior to setting. For instance, it is characteristic of this material that it cannot be set under water. Furthermore, it must be kept out of contact with water prior to reaching its ultimate position in the well. This is necessary to prevent flushing of the cement in the grout from the pore-forming aggregate therein. Contact with water is to be avoided, especially with respect to porous cement grouts containing included oil or other oleaginous ingredients as disclosed and claimed in copending application Serial No. 309,899, filed December 18, 1939, which matured into U. S. Patent No. 2,285,302 on June 2, 1942.

These and other difficulties necessitate the development of special methods and equipment for forming oil well filters from porous cement.

The object of the present invention is a new and improved arrangement for forming porous cement filters in oil wells. Additional objects will be appreciated from the following detailed description of the invention.

These objects are accomplished by disposing at the bottom of the well a removable liner. A packer may be provided in the casing above said liner. A string of tubing is placed in the well extending from the mouth of the well to the vicinity of the liner at the bottom of the well. Porous cement grout preferably comprising cement, water, oil, and sized aggregates is pumped down the string of tubing and is directed to the annular space between the drillable liner and the well bore by discharge means near the base of the tubing. The liner is provided with openings preferably near the bottom thereof which serve as an intake for displaced fluid. The fluid taken in is passed out near the top of the liner either into the well or up through an additional line of tubing at the top of the well.

The liner and annular ring of porous cement surrounding the same may be built up in sections, if desired. After the porous cement is permitted to set, the liner is removed by drilling or other suitable method creating a pumping cavity in the completed porous cement filter. In order to insure a completely continuous annular column of cement, it is preferred to build up the annular column in relatively short sections; for instance 10 to 20 feet in height. Additional sections can be added on top of the first by placing additional sections of liner and repeating the cementing operation.

After the cement is introduced the cement input tube is withdrawn from the well.

Figure 2:
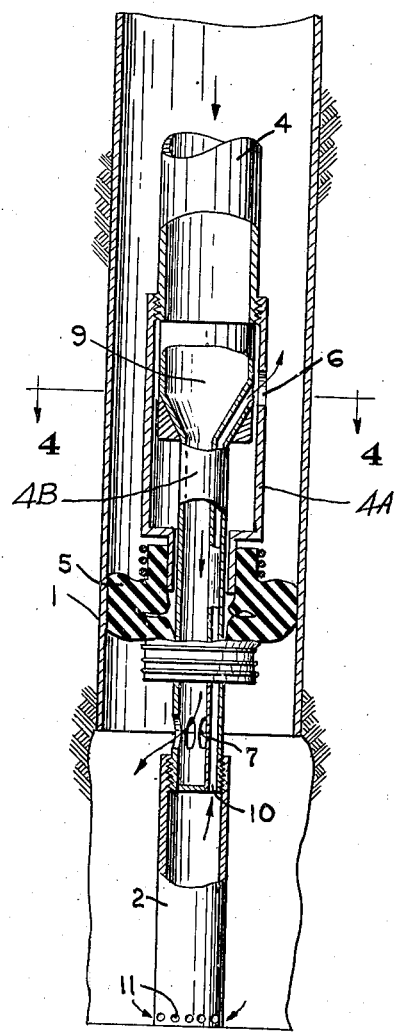
Figure 3:
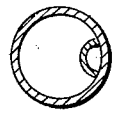
Figure 4:
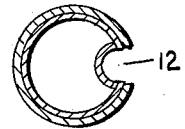

The invention may be understood more readily by referring to figures of the attached drawings. Figure 1 is a view in cross-section of the well showing the liner, tubing, and packer in their relative positions in the well. Figure 2 is a view of the same parts after the packer has been set and the assembly arranged for the step of introducing the cement about the liner. Figure 3 is a view in horizontal section along the line A—A of Figure 1. Figure 4 is a similar view along the line B—B of Figure 2. Figure 5 is a view in cross-section of the upper portion of the well.

Referring in detail to Figure 1, the casing 1 defines the upper portion of the well and terminates in the vicinity of the drillable liner 2 disposed at the bottom of the well. The porous cement filter is to be formed in the annular space surrounding the drillable liner between the latter and the well bore. This space may be closed at the top by means of a packer. The preferred embodiment shown in this figure includes the specially designed packer 3 which functions on the principle of compression of the sleeve 5, which comprises neoprene or some other rubber-like material. This packer surrounds the tubing 4A threaded to the lower end of the tubing 4 provided with the port 6. The tubing is designed with the lower portion 4B slidable within the upper portion 4A. The lower portion 4B is provided with ports 7 leading into the annular space below the packer. The drillable liner 2 is attached to the lower end of the tubing 4B by means of a threaded connection 8. Figure 2 shows the assembly of Figure 1 after the upper portion of the tube bearing the packer has been forced downward telescoping the lower portion of the tube which remains stationary and attached to the liner. The result is to set the packer as a closure means and at the same time force the upper portion of the tubing into contact with the extension 9 of the lower portion thereof to close the port 6 with respect to cement traveling down the tube, and to create the fluid exit or channel 10 extending from the liner up inside the tubing and out the port 6, for the passage of oil or other liquid from the liner. Small ports 11 are provided at the base of the liner.

This embodiment obviates the necessity of lowering simultaneously two or more separate strings of tubing. When the assembly reaches bottom the packer is set by compression as described, the weight of the tubing string generally being sufficient to cause the telescoping effect of the two portions of the tubing. Compression of the packer opens port 12, as shown in Figure 4, thus providing communication through the channel tube as noted between the liner and the annular space above the packer. The arrows in Figure 2 indicate the circulation of the cement grout. Its path may be described as follows: The grout enters the tubing 4 at its upper end, passes down the tubing 4A and 4B through the packer and out the ports 7 into the region surrounding the removable liner 2 to build up an annular filter body between this liner and the sides of the well. The displaced liquid enters the small ports 11 at the base of the liner and rises through the liner in the general direction shown by the upwardly directed arrows passing up through the packer along the channel 10 and eventually emerging from the tubing 4B through the port 6 into the upper region of the well. When the desired amount of cement has been placed it is allowed to take an initial set. The packer is then released, unscrewed from the liner and withdrawn.

Any suitable means may be employed for introduction of the cement into the top of the well. We prefer to operate with the arrangement shown in Figure 5, which depicts the container 13 adapted to hold the cement and oil slurry. It is equipped with the agitator 14 to maintain the proper dispersion. The pump 15 supplies air pressure above the cement layer in the container. A sight glass 16 is disposed in conduit 17 for noting the end of the cement flow from the container into the well tubing 4.

Although it is preferable to cement the entire hole in one operation, as illustrated, the job may be done in stages by using a longer section of tubing between the liner and the packer proper. Of course if no caving has occurred, the packer may be set in the open hole for a stage operation.

It is important that no water layer should be permitted to accumulate in the well. This, of course, can be obviated by pumping down oil or some high gravity liquid to displace the water prior to beginning the placement of the porous cement grout.

The foregoing arrangement has been determined to be ideal for the formation of porous cement oil well filters in situ, being especially adapted to prevent the thinning of the grout, or deterioration of the same from water or other causes prior to setting.

In the foregoing we have described the invention by referring to a particular embodiment thereof. It will be appreciated that the scope of the invention is not limited thereby but is determined only by the following claim.

We claim:

An apparatus for forming porous cement oil well filters which comprises a removable liner disposed at the bottom of the well, a lower portion of tubing attached to the top of said liner, an upper portion of tubing telescoping said lower portion, a compressible packer sleeve surrounding both portions of said tubing, the top of said sleeve packer being attached to the upper portion of said tubing and the lower portion of said sleeve packer being attached to the lower portion of said tubing, whereby the weight of said upper portion of tubing is adapted to telescope on said lower portion compressing said sleeve packer to close the bore of the well, ports disposed in the lower portion of said tubing opening into the annular space surrounding the tubing and liner, a port in the upper portion of said tubing, and an inner extension of the lower portion of said tubing adapted to contact the upper portion of said tubing during telescoping action and to form a channel tube from the interior of the liner to the annular space above the packer.

HARRISON HOWARD HOLMES.
WALTER EASTBY LAWSON.